June 21, 1932.    P. DE MATTIA    1,863,604
VULCANIZING MOLD
Filed Nov. 5, 1926    2 Sheets-Sheet 1

INVENTOR
Peter De Mattia
BY
Rogers, Kennedy & Campbell
ATTORNEYS

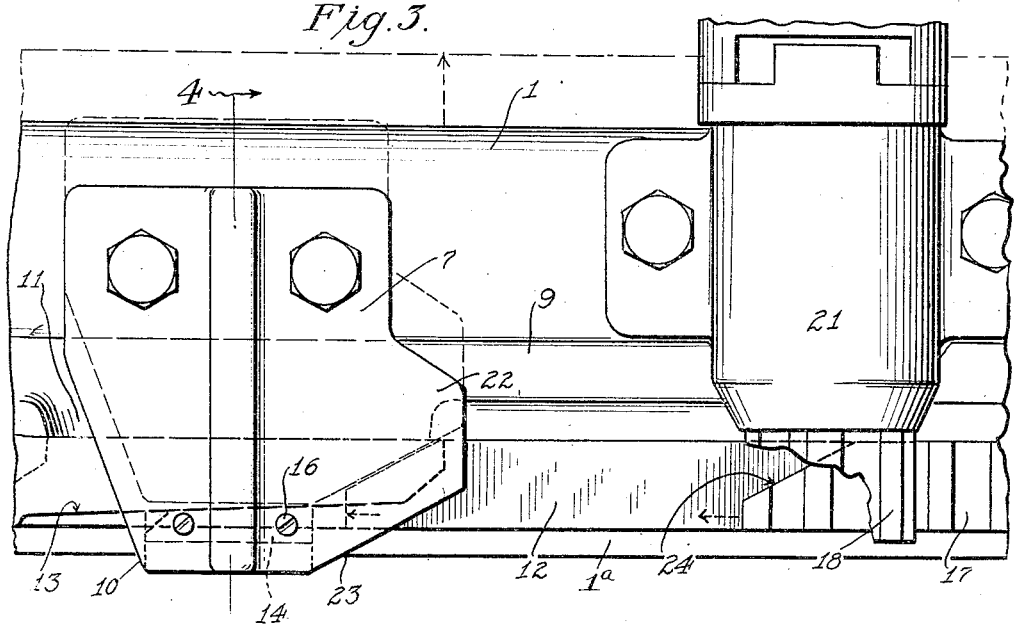
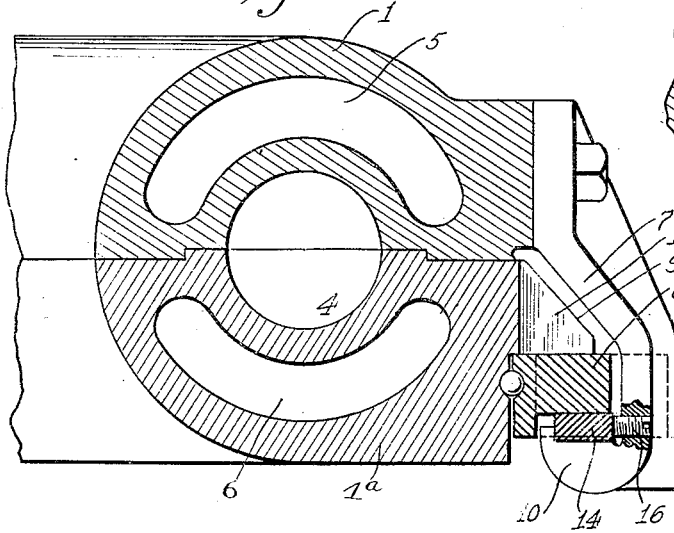
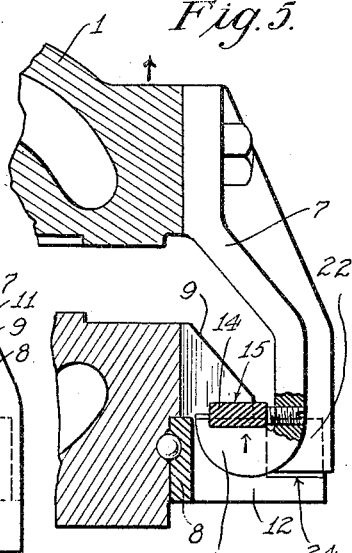

Patented June 21, 1932

1,863,604

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MOLD

Application filed November 5, 1926. Serial No. 146,324.

This invention relates to improvements in molds such as are used in the vulcanization of automobile tires, inner tubes, and the like, and has particular reference to molds of the type having hinged sections, one of which may be swung relative to the other to open the mold.

As is well known to those skilled in the art, considerable force is required to effect the final closing of a hinged sectional vulcanizing mold in order to properly confine the article to be vulcanized and to resist the high interval pressure exerted during vulcanization; and after vulcanization considerable force is also necessary to separate the mold sections due to the tendency of the tire or other article to stick to the surfaces of the mold. Numerous ways have been proposed for clamping the mold sections together, usually requiring great strength on the part of the operator, and a crow bar or other prying means is often resorted to for "breaking" the molds. Aside from the taxation of the operator's strength, the opening and closing operations of such prior art devices have necessarily been slow and therefore costly.

The present invention overcomes these and other objectionable features of the prior art, by providing a sectional vulcanizing mold which may be easily and quickly locked and unlocked, and in which the sections will be forcibly drawn together and forced apart in the locking and unlocking operations, respectively.

More specifically, the invention contemplates the provision of a locking ring rotatably mounted on one of the mold sections, and means on the other mold section for engaging the locking ring to effect an interlock therewith. Said engaging means may be in the form of hook members adapted to straddle portions of the locking ring, and the two elements so formed and related that the interlocking of the hook members with the locking ring will be accompanied by a drawing together of the mold sections.

The invention also contemplates the provision of means for quickly "breaking" the mold, that is, separating the sections, after the vulcanization operation, and this preferably simultaneously with the unlocking of the mold sections.

These and other features and advantages will be apparent from the following description when taken in connection with the accompanying drawings, wherein a preferred embodiment of the invention is shown by way of illustration.

In the drawings,

Fig. 3 is a side elevation, on a larger scale, showing more clearly the cooperating parts for drawing the mold sections together, and for separating them;

Fig. 4 is a vertical transverse sectional view on line 4—4 of Fig. 3, and showing the mold sections drawn together; and Fig. 5 is a similar view showing the mold sections slightly separated.

Figure 1:
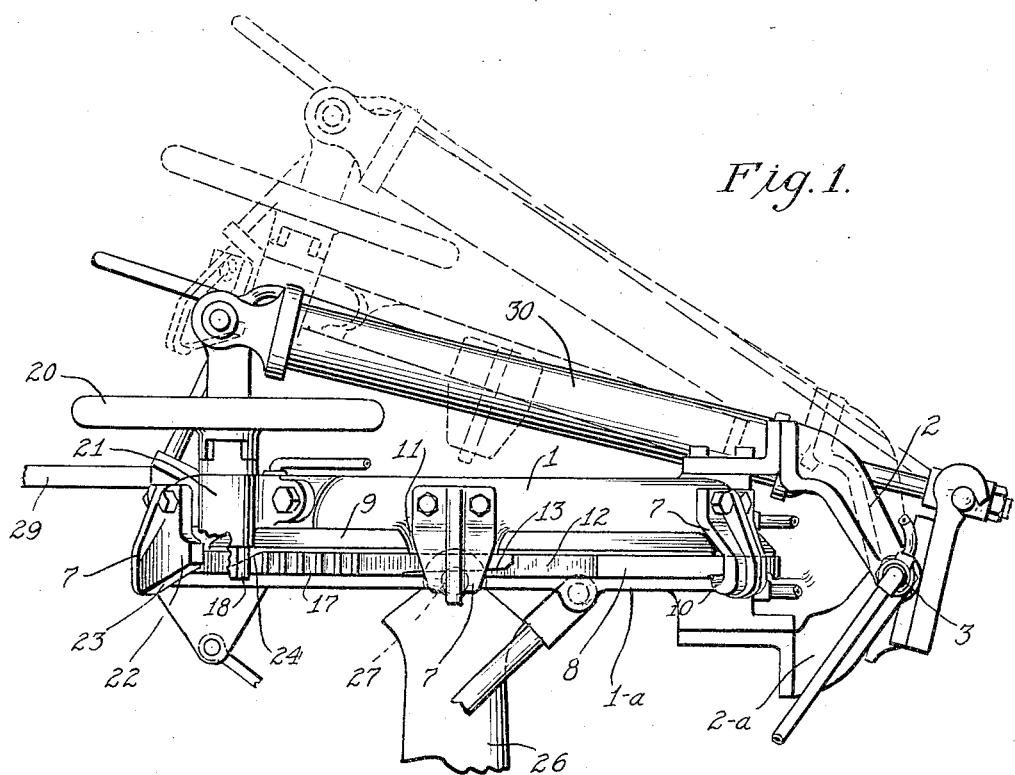
Fig. 1 is a fragmentary side elevation of a vulcanizing mold equipped with improved locking mechanism in accordance with the invention, the parts being shown in locked position.

The invention has been shown in the drawings as applied to a tube vulcanizing mold of the horizontal rocking type, but it is equally applicable to molds of the stationary type as well as to molds for vulcanizing tire casings and articles other than inner tubes. Such a tube-curing mold may comprise a pair of opposed mold sections 1 and 1ª having hinge members 2 and 2ª respectively, connected together as at 3 by a suitable pintle. The mold sections 1 and 1ª are suitably grooved on their mating faces to form an annular vulcanizing chamber 4 into which the article to be treated is placed, said vulcanizing chamber being surrounded by heating chambers or steam jackets 5 and 6.

Figure 2:
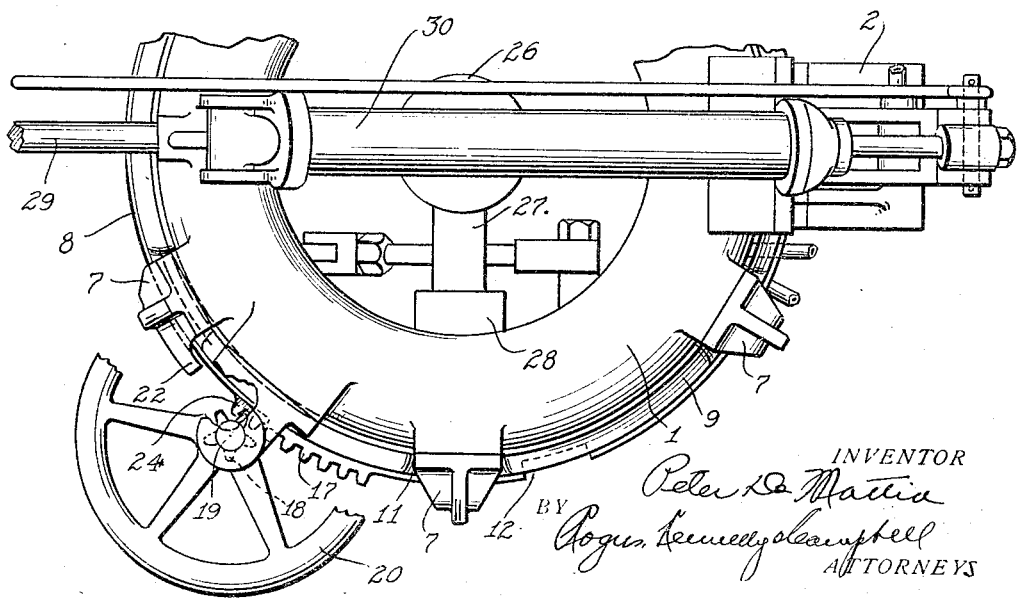
Fig. 2 is a fragmentary top plan view thereof.

In order to lock the two mold sections tightly together to resist internal pressure during vulcanization, the following improved mechanism is provided. The upper or swinging section 1 is provided with a plurality of downwardly extending hook members or lugs 7 adapted to engage a slotted ring 8 which is rotatably supported in any suitable manner against a guide flange 9 on the lower or fixed section 1ª. The hook members 7 are suitably spaced around the circumference of the mold section 1, as shown in Figs. 1 and 2, and their lower ends 10 extend inwardly in such manner as to straddle portions of the flange 9 and ring 8, and to bear against the lower surface of said ring (see particularly Fig. 4). The flange 9 is formed with slots or recesses 11 in radial alinement with the hook members 7, and the ring 8 is similarly provided with recesses 12 which, when alined with the recesses 11, as shown in Fig. 5, permit passage of the ends 10 of the hook members during the swinging movement of the mold section 1. At one side of the recesses 11, the lower surface of the ring 8 is beveled or inclined, as at 13, to form wedging surfaces for engagement with the ends 10 of the hook members, which may or may not be oppositely beveled as desired. Preferably, the ends 10 of the hook members are provided with detachable wearing plates 14, the upper surfaces 15 of which engage the wedging surfaces 13. The wearing plates 14 may be held in place in any suitable manner, as by the set screws 16.

It will be evident, from the foregoing, that as the locking ring 8 is turned about the mold section 1ª, after the movable section 1 has been swung against it, the wedging surfaces 13 will engage the hook members 7 and positively draw the two mold sections together and lock them securely in that condition.

The rotation of the locking ring 8 is effected by power means including a gear segment or rack 17, secured to the ring 8, and a small pinion 18 meshing with the rack 17 and fixed to the lower end of a shaft 19, and a large hand wheel 20 (Figs. 1 and 2) fixed to the upper end of the shaft 19. In the illustrated embodiment of the invention, the shaft 19 is shown as journalled at 21 to the movable mold section 1, but it may be mounted on the section 1ª if desired. By the employment of such power means, the operator without undue exertion may cause the locking ring 8 to draw the two mold sections together with great force.

Prior to this invention, it has been difficult to open the molds and to remove the work therefrom after vulcanization, due to the tendency of the rubber to adhere to the walls of the mold cavities, and another feature of the present invention is to provide means for facilitating and expediting this operation. To this end, one or more of the hook members 7 may be provided with an extension 22 at its side, against which the ring 8 turns in its locking movement. The lower edge 23 of the extension 22 is beveled or inclined preferably to a greater extent than the inclination of the surfaces 13. The ring 8 may also be formed with means for cooperating with the beveled edge 23, such means being shown in the drawings as including a beveled end 24 on the gear segment or rack 17. According to this arrangement, as the ring 8 is turned toward the left from the position shown in Figs. 1, 2 and 3, the recesses 12 in the ring will be brought into registration with the recesses 11 in the flange 9, disengaging the wedging surfaces 13 from the hook members. The wedging surface or beveled end 24 of the gear segment 17 then comes in contact with the inclined edge 23 of the adjacent hook member, and the continued movement of the ring results in the forcible separation of the two mold sections. The mechanism just described swings the mold section 1 to substantially the position shown in Fig. 5, with respect to the section 1ª, and from this position it may be manually moved to the fully opened position as indicated by dotted lines in Fig. 1.

The lower mold section 1ª is a relatively fixed section, it being supported by the usual pedestal 26, which, in the case of a rocking mold, is fitted with trunnions 27 having pivotal connection with said lower mold section. The upper mold section 1 may be provided with a handle 29, preferably at its front edge, by means of which said section may be swung with reference to the lower mold section 1ª, and to facilitate tilting of the closed mold on its pedestal. Any desired means may be employed for counterbalancing the movable mold section 1 and assisting in its movement, that shown in Figs. 1 and 2 being designated generally by the reference character 30 and including an improved spring mechanism such as is fully disclosed and claimed in my copending application bearing the Serial Number 137,845, filed September 27, 1926.

In using the device, the tube or other article to be vulcanized is placed within the mold chamber 4 in the usual manner and the movable mold section 1 is swung down against the fixed section 1ª. In such movement, the ends 10 of the locking lugs 7 pass through their respective recesses 11 and 12, and after said movable mold section has come to rest with respect to the fixed section, the locking ring 8 is partially rotated by means of the hand wheel 20. Thus the inclined bearing surfaces 13 are caused to engage the ends of the locking lugs to positively draw the two mold sections together and to lock them in such relationship. The article may then be subjected to the vulcanizing process, as usual, at the completion of which the mold may be quickly opened by operation of the hand wheel 20 to unlock the hook members 7. As said hook members become disengaged from the wedging surfaces 13, the inclined end 24 of the gear segment 17 engages the beveled edge 23 of the enlarged hook member and forcibly separates the two mold sections. The operator may then grasp the handle 29 and swing the mold section 1 upwardly about its hinge connection 3, to a position permitting removal of the vulcanized work from the mold.

From the foregoing it will be obvious that a substantial advance has been made in the art by the provision of my simplified locking means. The device may be economically produced, and is applicable to various types of molds, rendering them more easily operable. The invention is, of course, susceptible of numerous modifications, and the right is herein reserved to make such changes as fall within the scope of the appended claims without departing from the spirit of the invention.

Having thus described my invention what I claim is:

1. A vulcanizing mold having a relatively fixed mold section and a movable mold section hinged with reference thereto, a locking ring rotatably mounted on the fixed mold section, a plurality of hook members carried by the movable mold section and extending over the locking ring, said ring being slotted to permit passage of the ends of the hook members, and means on the movable mold section for rotating the locking ring to effect locking engagement of the parts when the mold is closed.

2. In a vulcanizing mold, a pair of separable mold sections, spaced peripheral locking members on one of the mold sections, a cooperating locking ring rotatably mounted on the other mold section, and means mounted on the first-named mold section for actuating said locking ring.

3. In a vulcanizing mold, a pair of opposed mold sections hinged with reference to each other, a locking ring rotatably mounted on one of the mold sections and having means for cooperating with the other mold section to draw the two together as the ring is rotated, and power means mounted on the other mold section for actuating the said locking ring, said power means having detachable connection with the locking ring.

4. In a vulcanizing mold, a relatively fixed mold section, a movable mold section hinged with reference thereto, a locking ring rotatably mounted on the fixed mold section, a plurality of hook members carried by the movable mold section, the ring and the hook members having cooperating portions for drawing the two mold sections together when the ring is turned in one direction, means for forcing the two mold sections apart when the ring is turned in the other direction, and power means on said movable mold section for rotating the ring to locking or unlocking position.

5. In a vulcanizing mold, a relatively fixed mold section disposed in a substantially horizontal plane, a movable mold section hinged with reference thereto and adapted to be swung upwardly from the fixed section to open the mold, locking lugs spaced around the periphery of said movable mold section, a locking ring rotatable on the fixed mold section and provided with lugs to cooperate with those on the movable mold section in locking and unlocking the mold, and power means for rotating the ring to its locking and unlocking positions, said power means including a gear segment on the locking ring, a pinion on the movable mold section for meshing with said gear segment when the mold is closed, and means for manually rotating said pinion.

In testimony whereof, I have affixed my signature hereto.

PETER DE MATTIA.